April 7, 1970     C. W. GULLIHUR     3,504,935
SWIVEL COUPLING FOR FLUID CONDUIT
Filed Feb. 3, 1969
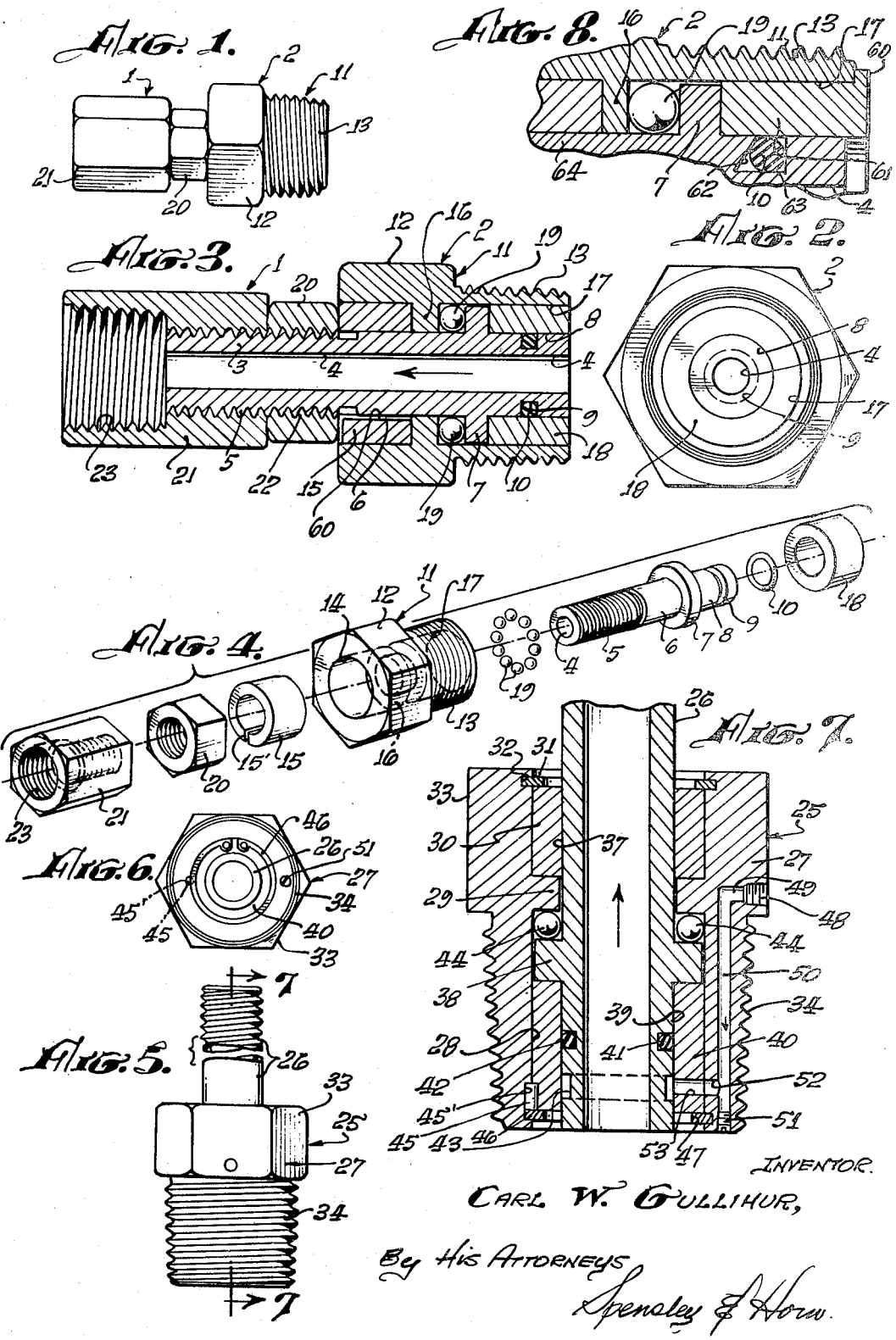
INVENTOR.
CARL W. GULLIHUR,
By His Attorneys
Spensley & How United States Patent Office 3,504,935
Patented Apr. 7, 1970

3,504,935
SWIVEL COUPLING FOR FLUID CONDUIT
Carl W. Gullihur, P.O. Box 1166,
Big Bear Lake, Calif. 92315
Filed Feb. 3, 1969, Ser. No. 795,975
Int. Cl. F16l 27/00, 19/02, 15/00
U.S. Cl. 285—14                                6 Claims

ABSTRACT OF THE DISCLOSURE

A connecting means between the adjacent ends of a pair of fluid conduits, particularly those subjected to considerable line pressure, characterized by capacity for free relative rotation between the connected conduits, either or both of which may be rigid or flexible is disclosed. A hollow cylindrical body member is rotatably connected inside an external body member by a plurality of bearing balls constituting axial thrust-resisting means. Bushings are positioned between the cylindrical body member and the external body member. A gasket is carried by the cylindrical body member and sealingly engages one of the bushings.

BACKGROUND OF THE INVENTION

Field of the invention

The field of the invention is that of fluid conduit swivel couplings having bearing and sealing means, and of the general character of those classified directly or by cross reference in class 285, subclass 98.

SUMMARY OF THE INVENTION

The invention is directed to the provision of a simple, reliable coupling means installable between adjacent members in a fluid conduit line and of rendering the resulting connected members capable of free relative rotation. It is characterized by the use of ball bearing means to resist axial thrust deriving from line pressure and by self lubricating surfaces to resist radial forces. In one embodiment of the invention a means for axial adjustment of the clearance between relatively rotating components is illustrated and in a second embodiment, there is provided means for connection to a second source of pressure fluid operative to prevent entry of the transmitted fluid between adjacent bearing surfaces of the coupling.

BRIEF DESCRIPTION OF THE DRAWINGS

The accompanying drawings illustrate certain presently preferred embodiments of the invention described in the specification following and in said drawings:

FIGURE 1 is a side elevational view of a swivel coupling constituting a first embodiment of the invention;

FIGURE 2 is an elevational view of the fluid entrant end of the fluid line coupling constituting a first preferred embodiment of the invention;

FIGURE 3 is a medial longitudinal sectional view of the coupling shown in FIGURES 1 and 2;

FIGURE 4 is an exploded view of the component parts of the embodiment shown in the preceding figures;

FIGURE 5 is a side elevational view of a second presently preferred embodiment of the invention;

FIGURE 6 is an enlarged scale, end elevational view of the discharge end of the coupling shown in FIGURE 5;

FIGURE 7 is a further enlarged, medial, longitudinal sectional view taken on the line 7—7 of FIGURE 5; and FIGURE 8 is a fragmentary, longitudinal, medial, sectional view showing a modified form of the invention.

DETAILED DESCRIPTION OF THE PREFERRED EMBODIMENTS

Before entering into the detailed description of the illustrated embodiments, it should be mentioned that they are generally intended for use with fluid flow in the direction indicated by the flow direction arrows in FIGURES 3 and 7. In general, having reference to those arrows, the inflow end of the device will be stationary with the outflow end free to rotate relative thereto, but as the description of the device proceeds, it will be appreciated that the coupling device permits the rotative movement of either or both of the conduit members interconnected thereby. Moreover, having reference to the flow direction arrows, while in FIGURES 2 and 5 the outflow ends are shown as being internally and externally threaded, respectively, with the inflow end externally threaded, either end may be provided with internal or external threads or the said ends may be provided with any type of connecting means that is complementary to the ends of the conduits to be connected by the coupling. Further, within limits, the flow direction may be in the opposite direction and accordingly, the use of the terms "inflow" and "outflow" or other similar terms employed in the specification will be understood to have been adopted for convenient description only.

Referring first to FIGURES 1 through 4, there is shown a first embodiment of the invention comprising an outflow assembly 1 and an inflow assembly 2 within which the outflow assembly is retained with capacity for free rotation by means now to be described. The outflow assembly comprises an elongated cylindrical body member 3 including a fluid conduit bore 4 extending from end to end thereof. The exterior of said body member from left to right, having reference to FIGURE 4, comprises a threaded portion 5, a first bearing surface 6, a thrust flange 7, and a second bearing surface 8 disposed in coaxial alignment with the bearing surface 6. A peripheral groove 9 formed in the bearing surface 8 contains an O-ring fluid seal element 10 engaging a bearing surface on the inflow assembly as will presently be described.

The inflow assembly 2 comprises a body member 11 having an outer surface comprising a hexagonal portion 12 for wrench engagement and an externally taper threaded portion 13 for connection to the inflow receiving conduit means that may be attached thereto. An axial bore extending through the inflow assembly body member comprises a first portion 14 opposite the external portion 12 and in which a bushing 15 is secured by any appropriate means as by a press fit, the inner end of said bushing being seated against a thrust flange 16 formed integrally with the body member 11, and said axial bore further includes a second portion 17 extending from the flange 16 to the inflow end of the body member in which a second bushing is received incident to assembly of the coupling as will now be described. If desired, the bushing 15 may be provided with a groove 15' extending longitudinally of the interior surface and thence radially across the exposed end of the bushing to facilitate the draining off of fluid from the ball bearing area.

In assembly, the body member 3 is inserted in the inflow end of the body member 11 in which the bushing 15 has previously been assembled, the inner surface of said bushing having bearing engagement with the bearing surface 6 of the body member 3. When thus partially assembled, and before the flange portion 7 enters the bore portion 17, a series of bearing balls 19 is placed in the annular groove formed by the upstream side of the flange 17, and the concentrically spaced wall surfaces formed by the bearing surface 8 and the bore 17. The body member 3 is then moved into the body member 11 until the upstream side of the flange 7 engages the balls 19. The O-ring 10 is seated in the groove 9 and the bushing 18 is pressed into place with the inner end thereof engaging the upstream face of the flange 7 preferably to an extent that will permit a slight amount of end play between the two body members. A thrust adjusting nut 20 is then screwed on the threaded end of the body member 3 and into engagement with the end face of the bushing 15 and adjusted to effect a desired amount of end play. Following this, a means for connecting the outflow end of the body member 3 is applied to the portion of the threaded end 4 which projects beyond the nut 20. In the illustrated embodiment, this is achieved by a union nut 21 having a threaded bore extending therethrough comprising a straight threaded portion 22 at one end engageable with the threaded portion 4 and abutting the nut 20 to serve as a lock nut for the adjustment achieved by the nut 20. Incidentally, this locking engagement also serves to secure the union nut 21 against loosening on the body member 3. The outflow end of the union nut 21 is provided with any suitable and desired means of connection with the fluid conduit member to which it is to be connected as, for example, the internal taper threaded portion 23.

Preferably, the bushings are formed of material for which lubrication is not required as, for example, Oilite, or some of the plastic materials suited for such use as, for example, Teflon or nylon. It will be particularly noted that the O-ring seal 10 effectually prevents the fluid being transmitted from entering the ball bearing race which is formed by the two body members. The device permits free rotative movement between the connected conduit members even when the fluid is under a considerable pressure. Examples of places of use are in auto wash equipment, spraying equipment and any situation in which relative rotative movement in a fluid line is desired with maximum protection against leakage at the swivel joint thus formed.

FIGURES 5, 6 and 7 illustrate a second embodiment of the invention characterized by an assembly of the relatively rotatable components by the use of snap ring retainer means. Additionally, this embodiment discloses the use of fluid under pressure between the relatively rotating surfaces of the downstream bearing to prevent contamination of those surfaces by abrasive materials entrained in the fluid being delivered through the device as, for example, in the delivery of drilling mud to a drill string. Specifically, the illustrated embodiment comprises an external assembly 25 and an internal tubular member 26 relatively rotatable therein. The said external assembly includes a body member 27 having an axial bore 28 extending therethrough, said bore being interrupted intermediate its ends by an annular rib or flange 29. The side face of said flange facing the downstream end of the body member serves as a seat for the end of a bearing bushing 30 which is retained in that end of the bore 28 by a snap ring 31 removably seated in a peripheral groove 32 formed in the bore 28 adjacent the outer end of said bore. Externally, the body member includes a polygonal or other wrench engageable surface 33 generally opposite the bearing bushing 30 and said outer surface of the body member extending from the surface 33 to the inflow end of the device comprises a taper threaded portion 34 adapted to engage complementary threads of a conduit means from which fluid is to be delivered through the device.

The tubular member 26 includes an externally threaded outflow end portion extending out of and beyond the outflow end of the body member 27 affording connection with a conduit to which fluid is to be transmitted, a bearing surface portion 37 having engagement with the interior of the bushing 30, an external peripheral thrust flange 38, a second bearing surface 39 adapted to be engaged by the interior of a second bearing bushing 40 presently to be described in more detail, a peripheral groove 41 in said second bearing surface in which an O-ring gasket 42 is seated and a shallow peripheral groove 43 to which more detailed reference will presently be made.

In assembly, assuming that the body member 27 has been assembled with the bushing 30 secured therein by the snap ring 31 or other equivalent means, the outflow end of the tubular member 26 is introduced into the bushing 30 from the inflow end of the body member 27 and a series of bearing balls 44 are then placed in the groove or channel formed by the bearing surface 37, the bore 28 and the upstream side of the flange 29. The tubular member is then moved into the body member 27 until the downstream side of the flange 38 engages the row of balls 44. The gasket 42 is then installed in the groove 41 and the bushing 40 is inserted in the upstream end of the bore 28 with the inner end thereof engaging the downstream side of the flange 38 sufficiently closely to reduce axial movement between the tubular member and the body member 27 to a minimum without imposing appreciable resistance to relative rotary movement therebetween. The bushing 40 is then secured in the bore 28 against rotative movement therein by any suitable means for a purpose to be presently described. In the illustrated embodiment, this is achieved by a dowel pin 45 inserted in a bore 45' formed in the line of the joint between the bushing and the bore 28. After the dowel pin has been inserted, the bushing is secured against endwise movement by a removable snap ring 46 installed in a groove 47 in the bore 28 at the upstream end thereof.

In deep well drilling, e.g., oil and gas wells, in which drilling "mud" is employed to bring the drilled out material to the surface, the drilling "mud" is introduced through the drill string and the connection between the nonrotating delivery conduit means and the rotating "string" is preferably such as will prevent the "mud" from entering the bearing surface of the swivel connection. To achieve this result in the present invention, the body member 27 is provided with an inlet port 48 which is threaded for connection with a source of fluid under pressure, e.g., water. As here shown, this port is disposed beyond the threaded end of the body member 27 and communicates with a radially extending bore 49 which, in turn, communicates with the adjacent end of a passage 50 formed in the side wall of the body member and which extends from the outflow end of said member toward the opposite end and terminates at the juncture with the bore 49. The open end of the passage is closed by any suitable means, e.g., a plug screw 51. Adjacent the inner end of the plug screw, the passage 50 communicates with an inwardly extending bore 52 which is disposed in registry with a bore 53 extending through one wall of the bushing 40 and communicates with the groove 43, the dowel pin 45 serving to hold the bushing in such rotative position that the passage 52 and bore 53 are maintained in alignment. Alternatively, the interior surface of the bushing 40 may be provided with an internal groove into which the bore 53 extends instead of the groove 43 in the tubular member.

In use, a supply of water under pressure is supplied to emerge through the bore 53 at a pressure which is slightly greater than the pressure of the drilling "mud" at the upstream side of the device and the water thus caused to flow out of the clearance between the bushing 40 and the bearing surface 39 serves to prevent entry of the drilling "mud" into the bearing areas. At the same time, some of the water will flow upwardly past the ball bearing thrust means and lubricate the bearing surfaces of the bushing 30 and the tubular member as well. The rate of flow can be relatively slight since all that is required is that there be at least some flow in opposition to the pressure of the drilling "mud."

Since the form and structure of the means by which a drill string is suspended is not essential to an understanding of the invention, no showing thereof has been made since it is believed to be obvious that apparatus embodying the invention can be substituting for whatever drilling "mud" connection may presently be employed within the skill of the art in effecting such substitution as distinguished from the concept and making of the device of the invention.

Referring to FIGURE 8, certain modifications are disclosed which may be employed separately or jointly on either of the illustrated embodiments. The first of these modifications comprises the provision of a radially outwardly extending flange 60 on the exposed end of the bearing bushing 61 at the inflow end of the device which, by engagement with the threaded end of the body member 11 or 27, serves to limit the extent to which the bushing can be inserted in the body member and thus to determine the axial clearance or play between the relatively rotating components to a predetermined value. The second of these modifications comprises the provision of an outwardly converging side surface 62 of the groove 63 on the exterior surface of the inflow end of the body member 64 (which corresponds to either of the members 3 or 26) and in which groove the O-ring 10 is housed. This sloping side wall reduces the outer width of the groove and thus reduces the width of contact of the O-ring with the opposing bushing which may be the bushing 61 illustrated in FIGURE 8 or the corresponding bushings 18 or 40 with resultant reduction of frictional resistance to relative rotional between the components of the device. This modification is especially useful in very large diameters of the device.

Thus there has been provided a swivel connecting means installable between the adjacent ends of a pair of fluid conduits which is composed of few parts of simple design, which is readily disassembled for servicing and which is efficient effective for its intended use.

I claim:

1. A connector for interconnecting a pair of fluid transmitting conduits comprising:
    an external body member having a bore extending therethrough, an internal annular shoulder and coupling means adaptable for coupling said body member with one of the pair of conduits;
    a hollow cylindrical body member mounted in said bore having an end portion adaptable for coupling with the other of said pair of conduits, a peripheral flange on said hollow cylindrical body member located such that a surface of said shoulder of said external body member and a surface of said flange form opposite bearing races, a plurality of bearing balls interposed between said surfaces and constituting axial thrust-resisting means;
    a first cylindrical bushing mounted in engagement with the internal surface of the upstream end of said external body member such that it engages the surface of said flange opposite said bearing races and extends substantially to the end of said external body member;
    a second cylindrical bushing mounted in engagement with the internal surface of the other end of said external body member such that it engages the surface of said shoulder opposite said bearing races, means for securing said bushings to said external body member; and
    a gasket means positioned in a groove on said cylindrical body member engaging said first bushing, adaptable to prevent transmitted fluid from entering said bearing races.

2. The connector defined in claim 1 wherein said gasket means comprises an O-ring seated in a peripheral groove on said cylindrical body member and wherein said groove is of a lesser width at its outer portion than at its bottom.

3. The connector defined in claim 1 including fluid pressure means operative to exclude transmitted fluid from entering between said first bushing means and said cylindrical body member upstream of said gasket means.

4. A conduit connector means as claimed in claim 3 in which said fluid entry preventing means comprises an inlet port on said external body member affording connection with a source of fluid under a pressure greater than the pressure of the transmitted fluid, said inlet port being connected by fluid passage means extending to and having communication with the surface area between said bushing means and said cylindrical body member upstream of said gasket means.

5. The connector defined in claim 1 wherein said second bushing has an interior groove adaptable for allowing fluid in the area of said races to be drained.

6. The connector defined in claim 1 wherein said first bushing has a flange at one end which engages said external body member and limits the movement of said bushing in said body member.

References Cited

UNITED STATES PATENTS

| | | | |
|---|---|---|---|
| 918,542 | 4/1909 | Hart | 285—281 |
| 2,185,822 | 1/1940 | Young | 285—98 X |
| 2,414,997 | 1/1947 | Atkins | 285—278 |
| 2,580,626 | 1/1952 | Warren | 285—281 X |
| 2,655,391 | 10/1953 | Atkins | 285—94 X |
| 2,733,080 | 1/1956 | Gill | 285—281 X |
| 2,770,475 | 11/1956 | Rafferty | 285—281 X |
| 2,836,439 | 5/1958 | Moore | 285—279 |

THOMAS F. CALLAGHAN, Primary Examiner

U.S. Cl. X.R.

285—94, 98